US009628147B2

(12) United States Patent  
Tsai et al.

(10) Patent No.: US 9,628,147 B2  
(45) Date of Patent: Apr. 18, 2017

(54) METHOD OF AUTOMATICALLY ADJUSTING DETERMINATION VOLTAGE AND VOLTAGE ADJUSTING DEVICE THEREOF

(71) Applicant: Fu Da Tong Technology Co., Ltd., New Taipei (TW)

(72) Inventors: Ming-Chiu Tsai, New Taipei (TW); Chi-Che Chan, New Taipei (TW)

(73) Assignee: Fu Da Tong Technology Co., Ltd., New Taipei (TW)

( * ) Notice: Subject to any disclaimer, the term of this patent is extended or adjusted under 35 U.S.C. 154(b) by 828 days.

(21) Appl. No.: 14/017,321

(22) Filed: Sep. 4, 2013

(65) Prior Publication Data  
US 2013/0342027 A1 Dec. 26, 2013

Related U.S. Application Data

(63) Continuation-in-part of application No. 13/541,090, filed on Jul. 3, 2012, now Pat. No. 9,075,587, and a  
(Continued)

(30) Foreign Application Priority Data

Feb. 1, 2011 (TW) .............................. 100103836 A  
May 3, 2013 (TW) .............................. 102115983 A

(51) Int. Cl.  
*H01F 27/42* (2006.01)  
*H01F 37/00* (2006.01)  
(Continued)

(52) U.S. Cl.  
CPC ............. *H04B 5/0037* (2013.01); *G06F 1/26* (2013.01); *G06F 1/266* (2013.01); *H02J 5/005* (2013.01);  
(Continued)

(58) Field of Classification Search  
CPC .. H02J 50/10; H02J 50/00; H02J 17/00; H02J 7/00; H04L 27/06; H04L 27/00;  
(Continued)

(56) References Cited

U.S. PATENT DOCUMENTS 4,297,680 A * 10/1981 Koeman .............. G01R 13/342  
341/123  
4,393,516 A 7/1983 Itani  
(Continued)

FOREIGN PATENT DOCUMENTS

CN 101252293 A 8/2008  
CN 101834473 A 9/2010  
(Continued)

*Primary Examiner* — Jagdeep Dhillon  
(74) *Attorney, Agent, or Firm* — Winston Hsu; Scott Margo

(57) ABSTRACT

A method of automatically adjusting a determination voltage used in an induction type power supply system includes detecting an output voltage of a signal analysis circuit; adding a first threshold value to the output voltage to generate a first determination voltage and subtracting a second threshold value from the output voltage to generate a second determination voltage; outputting the first determination voltage as a reference voltage; and comparing a trigger signal of the signal analysis circuit and the reference voltage, in order to generate a first data code; wherein when the step of comparing the trigger signal of the signal analysis circuit and the reference voltage in order to generate the first data code fails, the method further includes outputting the second determination voltage as the reference voltage and comparing the trigger signal of the signal analysis circuit and the reference voltage, in order to generate a second data code.

10 Claims, 9 Drawing Sheets

Related U.S. Application Data continuation-in-part of application No. 13/212,564, filed on Aug. 18, 2011, now Pat. No. 8,941,267, which is a continuation-in-part of application No. 13/154,965, filed on Jun. 7, 2011, now Pat. No. 8,810,072.

(51) Int. Cl.
| | | |
|---|---|---|
| *H01F 38/00* | (2006.01) | |
| *H04B 5/00* | (2006.01) | |
| *G06F 1/26* | (2006.01) | |
| *H02J 5/00* | (2016.01) | |
| *H02M 3/335* | (2006.01) | |

(52) U.S. Cl.
CPC ....... *H04B 5/0093* (2013.01); *H02M 3/33576* (2013.01); *H04B 5/0081* (2013.01)

(58) Field of Classification Search
CPC . H01F 38/00; H01F 38/14; G06F 1/00; G06F 1/26; G06F 1/28
USPC ...... 307/104, 149, 66, 64, 43; 713/340, 300; 375/340; 341/155, 157
See application file for complete search history.

(56) References Cited

U.S. PATENT DOCUMENTS

| | | | |
|---|---|---|---|
| 4,561,443 | A | 12/1985 | Hogrefe |
| 5,734,254 | A | 3/1998 | Stephens |
| 5,987,244 | A | 11/1999 | Kau |
| 6,122,329 | A | 9/2000 | Zai |
| 6,154,375 | A | 11/2000 | Majid |
| 6,184,651 | B1 | 2/2001 | Fernandez |
| 6,345,203 | B1 | 2/2002 | Mueller |
| 7,336,929 | B2 | 2/2008 | Yasuda |
| 7,720,452 | B2 | 5/2010 | Miyahara |
| 7,791,311 | B2 | 9/2010 | Sagoo |
| 7,847,438 | B2 | 12/2010 | Jin |
| 8,004,235 | B2 | 8/2011 | Baarman |
| 8,041,974 | B2 | 10/2011 | Lin |
| 8,072,310 | B1 | 12/2011 | Everhart |
| 8,098,043 | B2 | 1/2012 | Lin |
| 8,183,827 | B2 | 5/2012 | Lyon |
| 8,188,619 | B2 | 5/2012 | Azancot |
| 8,217,535 | B2 | 7/2012 | Uchida et al. |
| 8,217,621 | B2 | 7/2012 | Tsai et al. |
| 8,248,024 | B2 | 8/2012 | Yuan et al. |
| 8,358,103 | B2 * | 1/2013 | Eastlack ................ H02J 7/025 320/108 |
| 8,373,387 | B2 | 2/2013 | Bourilkov et al. |
| 8,412,963 | B2 | 4/2013 | Tsai et al. |
| 8,417,359 | B2 | 4/2013 | Tsai et al. |
| 8,541,975 | B2 | 9/2013 | Park et al. |
| 8,772,979 | B2 | 7/2014 | Tsai |
| 8,810,072 | B2 | 8/2014 | Tsai |
| 9,048,881 | B2 | 6/2015 | Tsai |
| 9,075,587 | B2 | 7/2015 | Tsai |
| 2006/0017550 | A1 | 1/2006 | Yoshida |
| 2007/0177533 | A1 | 8/2007 | Palay |
| 2008/0079392 | A1 | 4/2008 | Baarman |
| 2008/0231120 | A1 | 9/2008 | Jin |
| 2009/0009006 | A1 | 1/2009 | Jin |
| 2009/0026844 | A1 | 1/2009 | Iisaka |
| 2009/0033294 | A1 | 2/2009 | Odajima |
| 2009/0174263 | A1 | 7/2009 | Baarman |
| 2009/0267561 | A1 | 10/2009 | Lin |
| 2009/0271048 | A1 | 10/2009 | Wakamatsu |
| 2009/0284082 | A1 | 11/2009 | Mohammadian |
| 2009/0302800 | A1 | 12/2009 | Shiozaki |
| 2009/0322280 | A1 | 12/2009 | Kamijo |
| 2010/0007307 | A1 | 1/2010 | Baarman |
| 2010/0270867 | A1 | 10/2010 | Abe |
| 2010/0277003 | A1 | 11/2010 | Von Novak et al. |
| 2010/0279606 | A1 | 11/2010 | Hillan |
| 2011/0136550 | A1 | 6/2011 | Maugars |
| 2011/0158329 | A1 | 6/2011 | Oettinger |
| 2011/0159812 | A1 | 6/2011 | Kim |
| 2011/0176589 | A1 | 7/2011 | Kolof |
| 2011/0196544 | A1 | 8/2011 | Baarman |
| 2011/0204723 | A1 | 8/2011 | Irish |
| 2011/0264945 | A1 | 10/2011 | Tsai |
| 2011/0278949 | A1 | 11/2011 | Tsai |
| 2011/0285212 | A1 | 11/2011 | Higuma |
| 2011/0299636 | A1 | 12/2011 | Tsai |
| 2012/0007443 | A1 * | 1/2012 | Tsai ........................ H02J 5/005 307/104 |
| 2012/0025622 | A1 | 2/2012 | Kim |
| 2012/0193998 | A1 * | 8/2012 | Tsai ........................ H02J 7/025 307/104 |
| 2012/0229319 | A1 * | 9/2012 | Takahashi ............. H03M 1/007 341/155 |
| 2012/0272076 | A1 | 10/2012 | Tsai |
| 2012/0293009 | A1 | 11/2012 | Kim |
| 2012/0328061 | A1 | 12/2012 | Chow |
| 2013/0015705 | A1 | 1/2013 | Abe |
| 2013/0162204 | A1 | 6/2013 | Jung |
| 2013/0175873 | A1 | 7/2013 | Kwon |
| 2013/0176023 | A1 | 7/2013 | Komiyama |
| 2013/0234532 | A1 | 9/2013 | Fells |
| 2014/0024919 | A1 | 1/2014 | Metzenthen |
| 2014/0152251 | A1 | 6/2014 | Kim |
| 2015/0008748 | A1 * | 1/2015 | Deboy .................... H02J 3/383 307/77 |
| 2015/0008756 | A1 | 1/2015 | Lee |
| 2015/0028875 | A1 | 1/2015 | Irie |
| 2015/0207333 | A1 * | 7/2015 | Baarman ................. H02J 17/00 307/104 |

FOREIGN PATENT DOCUMENTS

| | | |
|---|---|---|
| CN | 101978571 A | 2/2011 |
| CN | 101272063 B | 1/2012 |
| CN | 102315692 A | 1/2012 |
| CN | 102710409 A | 10/2012 |
| CN | 102804619 A | 11/2012 |
| CN | 102904475 A | 1/2013 |
| CN | 103248130 A | 8/2013 |
| CN | 103424133 A | 12/2013 |
| CN | 103425169 A | 12/2013 |
| CN | 103595144 A | 2/2014 |
| CN | 103975497 A | 8/2014 |
| CN | 105449875 A | 3/2016 |
| EP | 2608419 A2 | 6/2013 |
| EP | 2 793 355 A1 | 10/2014 |
| JP | 200660909 A | 3/2006 |
| TW | M246884 | 10/2004 |
| TW | 200527302 | 8/2005 |
| TW | 201018042 | 5/2010 |
| TW | 201034334 A1 | 9/2010 |
| TW | 201123673 | 7/2011 |
| TW | 201123676 | 7/2011 |
| TW | 201128972 | 8/2011 |
| TW | 201138258 | 11/2011 |
| TW | 201234871 | 8/2012 |
| TW | 201243281 | 11/2012 |
| TW | 201251389 | 12/2012 |
| TW | I389416 | 3/2013 |
| TW | 201315082 | 4/2013 |
| TW | I408861 | 9/2013 |
| TW | 201412047 | 3/2014 |
| TW | 201414130 | 4/2014 |
| TW | 201415752 | 4/2014 |
| TW | 201417445 | 5/2014 |
| TW | 201440368 A | 10/2014 |
| TW | I459676 B | 11/2014 |
| TW | I472897 | 2/2015 |
| TW | I483509 B | 5/2015 |
| WO | 2009149464 A2 | 12/2009 |

* cited by examiner

US 9,628,147 B2

METHOD OF AUTOMATICALLY ADJUSTING DETERMINATION VOLTAGE AND VOLTAGE ADJUSTING DEVICE THEREOF

CROSS REFERENCE TO RELATED APPLICATIONS

This application is a continuation-in-part of U.S. application Ser. No. 13/212,564, filed on Aug. 18, 2011 and entitled "High-power induction-type power supply system and its bi-phase decoding method", which is further a continuation-in-part of U.S. application Ser. No. 13/154,965, filed on Jun. 7, 2011 and entitled "High-power induction-type power supply system and its data transmission method", and a continuation-in-part of U.S. application Ser. No. 13/541,090, filed on Jul. 3, 2012 and entitled "Induction type power supply system with synchronous rectification control for data transmission".

BACKGROUND OF THE INVENTION

1. Field of the Invention

The present invention relates to a method of automatically adjusting a determination voltage used in an induction type power supply system and a determination voltage adjustment device thereof, and more particularly, to a method of automatically adjusting a determination voltage and a determination voltage adjustment device thereof capable of amplifying strength of a feedback signal of the induction type power supply system, in order to enhance sensitivity for signal interpretation.

2. Description of the Prior Art

For the purposes of safety, a power supply device of an induction type power supply system has to ensure that a proper power receiving device is positioned on the supplying-end coil of the power supply device and ready to receive power before power is supplied. In order to allow the power supply device to identify whether the power receiving device is accurate, a data code should be transmitted for identification purposes. The data code transmission is performed via the following steps: the power supply device first drives the supplying-end coil to generate resonance and sends electromagnetic power to the power receiving device in order to transmit power. When the power receiving device receives the power, the power receiving device may change the impedance on the receiving-end coil via the signal modulation technology, and the variations are fed back to vary the amplitude of carriers on the supplying-end coil. The signals of the supplying-end coil are then converted into digital information to be transmitted to a supplying-end microprocessor for interpretation via a circuit. The variations in amplitude of carriers on the supplying-end coil, however, are quite weak and easily interfered with by noise, so that such variations may not easily be extracted and converted into accurate logic signals in digital form. In the prior art, the industry provides a method of using active band-pass filters, couplers and voltage comparators composed of multiple operational amplifiers to perform the signal conversion. Such a design is complex and difficult to manufacture. U.S. application Ser. No. 13/212,564 provides a simplified filter composed of resistors and capacitors to output signals to a voltage comparator. The comparator compares the signals with a predetermined voltage level to output digital signals. Such a circuit is simple and easily manufactured.

The above circuit structure in the prior art still has some drawbacks, however. After the carried signals on the supplying-end coil are transmitted to the signal analysis circuit to perform half-wave rectification, the variations are attenuated by half. If there is no amplifier, the small signal may not easily be identified. The reference voltage of the comparator is generated via two voltage-dividing resistors connected to the power terminal and the ground terminal, respectively. The resistor elements may possess errors during manufacture, which may cause a deviation on the defined voltage level. The reference voltage and the normal voltage of the signal therefore cannot be too close; otherwise, a wrong signal may be output due to the errors in resistance values. Since the reference voltage cannot be close to the normal voltage, the sensitivity for signal interpretation may also be decreased. In the prior art, in order to recognize and trigger both positive and negative signals, two comparators are required to set two reference voltages to act as upward and downward triggers for the signals. Since there are errors in the resistance elements, the comparators will be harder to manufacture and set. The prior art may only determine the trigger signals from the power receiving end and transform the trigger signals to a digital data code, but the signal strength of data cannot be estimated. When the signal is weak, the system cannot insert power on the signal to enhance the signal strength. If the coil cannot be coupled well, the signal transmission capability may easily be lost.

Thus, there is a need for improvement over the prior art.

SUMMARY OF THE INVENTION

It is therefore an objective of the present invention to provide a method of automatically adjusting a determination voltage used in an induction type power supply system and a determination voltage adjustment device for performing the method, which is capable of amplifying the strength of a feedback signal in the induction type power supply system, and realizing the reference voltage for the comparator by using a circuit structure with higher accuracy, in order to enhance the sensitivity of signal interpretation. Such a method of automatically adjusting the determination voltage and determination voltage adjustment device can automatically control the comparator to use a positive-phase or negative-phase trigger signal to perform interpretation, and adjust magnitude of the reference voltage.

The present invention discloses a method of automatically adjusting a determination voltage used in an induction type power supply system. The method comprises detecting an output voltage of a signal analysis circuit; adding a first threshold value to the output voltage to generate a first determination voltage and subtracting a second threshold value from the output voltage to generate a second determination voltage; outputting the first determination voltage as a reference voltage; and comparing a trigger signal of the signal analysis circuit and the reference voltage, in order to generate a first data code; wherein when the step of comparing the trigger signal of the signal analysis circuit and the reference voltage in order to generate the first data code fails, the method further comprises outputting the second determination voltage instead of the first determination voltage as the reference voltage, and comparing the trigger signal of the signal analysis circuit and the reference voltage, in order to generate a second data code.

The present invention further discloses a determination voltage adjustment device used in an induction type power supply system. The determination voltage adjustment device comprises a detector, for detecting an output voltage of a signal analysis circuit; an adjustment microprocessor, electrically connected to the detector, for adding a first threshold value to the output voltage to generate a first determination voltage and subtracting a second threshold value from the output voltage to generate a second determination voltage; an output device, electrically connected to the adjustment microprocessor, for outputting the first determination voltage as a reference voltage; and a comparator, of which two input terminals are electrically connected to the detector and the output device respectively and an output terminal is electrically connected to the adjustment microprocessor, for comparing a trigger signal of the signal analysis circuit and the reference voltage, in order to generate a first data code; wherein when the comparator fails to generate the first data code by comparing the trigger signal of the signal analysis circuit and the reference voltage, the output device outputs the second determination voltage instead of the first determination voltage as the reference voltage, and the comparator compares the trigger signal of the signal analysis circuit and the reference voltage, in order to generate a second data code.

The present invention further discloses a rectifier and signal feedback circuit used in a receiving-end module of an induction type power supply system, for rectifying power received by a receiving-end coil of the receiving-end module and modulating a feedback signal. The rectifier and signal feedback circuit comprises a first high-side diode and a first low-side switch, electrically connected to a first terminal of the receiving-end coil, for performing rectification; a second high-side diode and a second low-side switch, electrically connected to a second terminal of the receiving-end coil, for performing rectification; a first resistor and a second resistor, electrically connected to the first terminal and the second terminal of the receiving-end coil respectively, for modulating the feedback signal; a third switch and a fourth switch, each comprising a drain electrically connected to the first resistor and the second resistor respectively, a source electrically connected to a ground terminal, and a gate electrically connected to a receiving-end microprocessor, for controlling the first resistor and the second resistor to modulate the feedback signal and controlling the first low-side switch and the second low-side switch to perform rectification; a third resistor, electrically connected between the first terminal of the receiving-end coil and a gate of the second low-side switch, for protecting the second low-side switch in order to prevent the second low-side switch from being burnt, and providing rectification switching signals for the second low-side switch; a fourth resistor, electrically connected between the second terminal of the receiving-end coil and a gate of the first low-side switch, for protecting the first low-side switch in order to prevent the first low-side switch from being burnt, and providing rectification switching signals for the first low-side switch; a first zener diode, electrically connected between the gate of the first low-side switch and the ground terminal, for limiting a voltage of the gate of the first low-side switch, in order to prevent the first low-side switch from being burnt; a second zener diode, electrically connected between the gate of the second low-side switch and the ground terminal, for limiting a voltage of the gate of the second low-side switch, in order to prevent the second low-side switch from being burnt; a first control diode, electrically connected between the gate of the first low-side switch and the third switch, for providing a conducting path from the gate of the first low-side switch to the ground terminal, and preventing signals of other rectification cycles from flowing in reverse from the receiving-end coil to the gate of the first low-side switch; and a second control diode, electrically connected between the gate of the second low-side switch and the fourth switch, for providing a conducting path from the gate of the second low-side switch to the ground terminal, and preventing signals of other rectification cycles from flowing in reverse from the receiving-end coil to the gate of the second low-side switch.

The present invention further discloses an induction type power supply system. The induction type power supply system comprises a supplying-end module and a receiving-end module. The supplying-end module comprises a supplying-end coil, for supplying power and transmitting signals; a power driver unit, electrically connected to the supplying-end coil, for driving the supplying-end coil; a coil voltage detection circuit, electrically connected to the supplying-end coil, for detecting a voltage of the supplying-end coil; a signal analysis circuit, electrically connected to the supplying-end coil, for detecting and analyzing data signals of the supplying-end coil; a supplying-end microprocessor, electrically connected to the power driver unit and the coil voltage detection circuit, for controlling operations of the supplying-end module; a display unit, electrically connected to the supplying-end microprocessor, for displaying an operation status of the supplying-end module; a power supplying unit, electrically connected to the power driver unit and the supplying-end microprocessor, for receiving power from a power source in order to provide power to be transmitted by the supplying-end coil and power required for operations of the supplying-end module; and a determination voltage adjustment device, electrically connected to the supplying-end microprocessor and the signal analysis circuit. The determination voltage adjustment device comprises a detector, for detecting an output voltage of the signal analysis circuit; an adjustment microprocessor, electrically connected to the detector, for adding a first threshold value to the output voltage to generate a first determination voltage and subtracting a second threshold value from the output voltage to generate a second determination voltage; an output device, electrically connected to the adjustment microprocessor, for outputting the first determination voltage as a reference voltage; and a comparator, of which two input terminals are electrically connected to the detector and the output device respectively and an output terminal is electrically connected to the adjustment microprocessor, for comparing a trigger signal of the signal analysis circuit and the reference voltage, in order to generate a first data code; wherein when the comparator fails to generate the first data code by comparing the trigger signal of the signal analysis circuit and the reference voltage, the output device outputs the second determination voltage instead of the first determination voltage as the reference voltage, and the comparator compares the trigger signal of the signal analysis circuit and the reference voltage in order to generate a second data code. The receiving-end module comprises a receiving-end coil, for receiving power from the supplying-end coil and transmitting a feedback signal to the supplying-end module; a voltage detection circuit, electrically connected to the receiving-end coil, for detecting a voltage of the receiving-end coil; a receiving-end microprocessor, electrically connected to the voltage detection circuit, for controlling operations of the receiving-end module; a rectifier and signal feedback circuit, electrically connected to the receiving-end coil and the receiving-end microprocessor, for rectifying power received by the receiving-end coil and modulating the feedback signal; a protection circuit breaker, electrically connected to the receiving-end coil and the receiving-end microprocessor, for preventing the receiving-end module and a load element from being burnt; and a voltage stabilizer circuit, electrically connected to the receiving-end coil, the protection circuit breaker and the receiving-end microprocessor, for receiving power from the receiving-end coil, in order to output a stable voltage to a load terminal; wherein the rectifier and signal feedback circuit comprises a first high-side diode and a first low-side switch, electrically connected to a first terminal of the receiving-end coil, for performing rectification; a second high-side diode and a second low-side switch, electrically connected to a second terminal of the receiving-end coil, for performing rectification; a first resistor and a second resistor, electrically connected to the first terminal and the second terminal of the receiving-end coil respectively, for modulating the feedback signal; a third switch and a fourth switch, each comprising a drain electrically connected to the first resistor and the second resistor respectively, a source electrically connected to a ground terminal, and a gate electrically connected to the receiving-end microprocessor, for controlling the first resistor and the second resistor to modulate the feedback signal and controlling the first low-side switch and the second low-side switch to perform rectification; a third resistor, electrically connected between the first terminal of the receiving-end coil and a gate of the second low-side switch, for protecting the second low-side switch in order to prevent the second low-side switch from being burnt, and providing rectification switching signals for the second low-side switch; a fourth resistor, electrically connected between the second terminal of the receiving-end coil and a gate of the first low-side switch, for protecting the first low-side switch in order to prevent the first low-side switch from being burnt, and providing rectification switching signals for the first low-side switch; a first zener diode, electrically connected between the gate of the first low-side switch and the ground terminal, for limiting a voltage of the gate of the first low-side switch, in order to prevent the first low-side switch from being burnt; a second zener diode, electrically connected between the gate of the second low-side switch and the ground terminal, for limiting a voltage of the gate of the second low-side switch, in order to prevent the second low-side switch from being burnt; a first control diode, electrically connected between the gate of the first low-side switch and the third switch, for providing a conducting path from the gate of the first low-side switch to the ground terminal, and preventing signals of other rectification cycles from flowing in reverse from the receiving-end coil to the gate of the first low-side switch; and a second control diode, electrically connected between the gate of the second low-side switch and the fourth switch, for providing a conducting path from the gate of the second low-side switch to the ground terminal, and preventing signals of other rectification cycles from flowing in reverse from the receiving-end coil to the gate of the second low-side switch.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
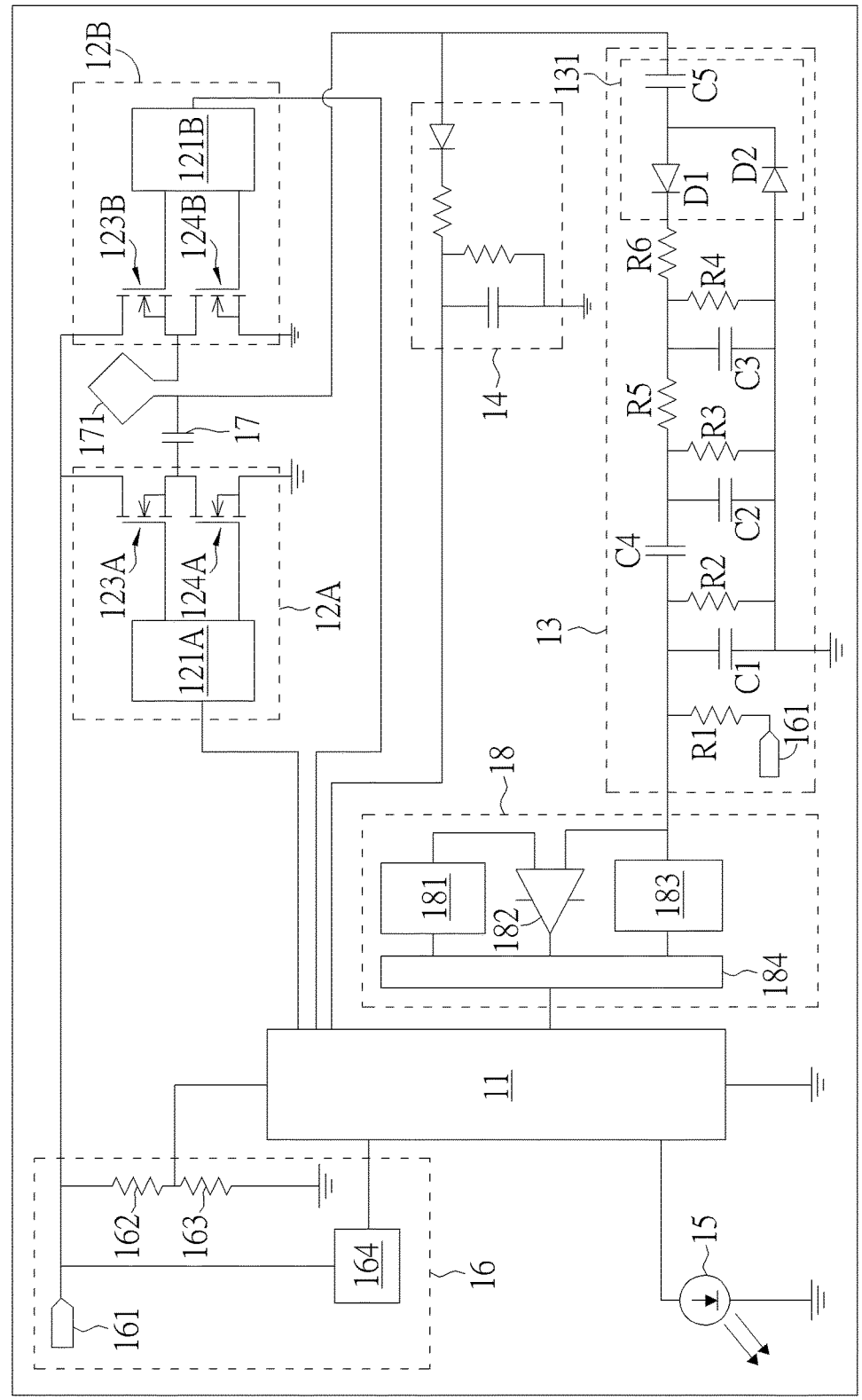
FIG. 1 is a schematic diagram of a supplying-end module of an induction type power supply system according to an embodiment of the present invention.

Please refer to FIG. 1, which is a schematic diagram of a supplying-end module 10 of an induction type power supply system according to an embodiment of the present invention. As shown in FIG. 1, the supplying-end module 10 includes a supplying-end microprocessor 11, power driver units 12A and 12B, a signal analysis circuit 13, a coil voltage detection circuit 14, a display unit 15, a power supplying unit 16, a resonant capacitor 17, a supplying-end coil 171 and a determination voltage adjustment device 18. The supplying-end microprocessor 11, electrically connected to the power driver units 12A and 12B, the coil voltage detection circuit 14, the display unit 15, the power supplying unit 16 and the determination voltage adjustment device 18, is utilized for controlling each operation of the supplying-end module 10. The power driver unit 12A includes a driver 121A, a high-side switch 123A and a low-side switch 124A. The power driver unit 12B includes a driver 121B, a high-side switch 123B and a low-side switch 124B. The power driver units 12A and 12B having similar structures are both electrically connected to the supplying-end coil 171. The power driver units 12A and 12B are utilized for driving operations of the supplying-end coil 171. When the power driver units 12A and 12B are both active, full-bridge driving is performed. In one embodiment, only one of the power driver units 12A and 12B may be active, or only one of the power driver units 12A or 12B is disposed, which leads to half-bridge driving. The signal analysis circuit 13 includes filters composed of resistors R1-R6 and capacitors C1-C4, and is electrically connected to the supplying-end coil 171 and the determination voltage adjustment device 18. The signal analysis circuit 13 is utilized for detecting and analyzing data signals at the supplying-end coil 171, and transmitting the signal analyzing results to the determination voltage adjustment device 18 for follow-up interpretation and processing. In order to enhance the strength of the analyzed signal, a clamping circuit 131 may be included at the front end of the signal analysis circuit 13, in order to clamp the input signals of the signal analysis circuit 13 to a higher voltage level. The clamping circuit 131 can enhance the strength of the trigger signals, which further increases the possibility that the back end successfully interprets the data code. The clamping circuit 131 is composed of diodes D1 and D2 and a capacitor C5.

Please keep referring to FIG. 1. The coil voltage detection circuit 14, a circuit composed of resistors, capacitors and diodes, is electrically connected to the supplying-end coil 171 and the supplying-end microprocessor 11. The coil voltage detection circuit 14 is utilized for detecting the voltage of the supplying-end coil 171, and providing the voltage information for the supplying-end microprocessor 11 to perform follow-up interpretation and processing. The display unit 15, electrically connected to the supplying-end microprocessor 11, is utilized for displaying the operational status of the supplying-end module 10. The power supplying unit 16, composed of voltage-dividing resistors 162, 163 and a DC-DC buck converter 164, is electrically connected to the power driver units 12A and 12B and the supplying-end microprocessor 11. The power supplying unit 16 is utilized for receiving power from a power source 161, in order to provide power to be transmitted by the supplying-end coil 171 and power required for operations of the supplying-end module 10. The resonant capacitor 17, electrically connected to the supplying-end coil 171, is utilized for assisting the supplying-end coil 171 to perform resonance to generate AC electromagnetic power to be sent to the power receiving end. The supplying-end coil 171, electrically connected to the resonant capacitor 17, the power driver units 12A and 12B, the signal analysis circuit 13 and the coil voltage detection circuit 14, is utilized for sending power to the power receiving end and receiving the feedback signals from the power receiving end, in order to transmit the feedback signals to the signal analysis circuit 13 to be analyzed. The determination voltage adjustment device 18 includes a detector 183, an adjustment microprocessor 184, an output device 181 and a comparator 182. The detector 183, electrically connected to the signal analysis circuit 13 and the adjustment microprocessor 184, is utilized for detecting the output voltages and signals of the signal analysis circuit 13, in order to output the voltages and signals to the adjustment microprocessor 184. In an embodiment, the detector 183 includes an analog-to-digital converter (ADC) for converting the analog signals of the signal analysis circuit 13 into signals in digital form to be outputted to the adjustment microprocessor 184 for follow-up interpretation and processing. The adjustment microprocessor 184, electrically connected to the detector 183 and the output device 181, is utilized for receiving the output voltage from the detector 183, and generating a higher determination voltage and a lower determination voltage according to the output voltage. The adjustment microprocessor 184 then selectively outputs the higher determination voltage or the lower determination voltage to the output device 181. The output device 181, electrically connected to the adjustment microprocessor 184 and the comparator 182, is utilized for receiving the voltage signals from the adjustment microprocessor 184, in order to output them to the comparator 182 as the reference voltage. In an embodiment, the output device 181 includes a digital-to-analog converter (DAC) for converting the higher determination voltage signals or the lower determination voltage signals in digital form generated from the adjustment microprocessor 184 into the reference voltage in analog form, in order to enable the comparator 182 to provide follow-up interpretation and processing. An input terminal of the comparator 182 is electrically connected to the detector 183 for receiving the trigger signal from the signal analysis circuit 13, another input terminal of the comparator 182 is electrically connected to the output device 181 for receiving the reference voltage, and the output terminal of the comparator 182 is electrically connected to the adjustment microprocessor 184. The comparator 182 compares the trigger signal and the reference voltage, in order to generate a data code to the adjustment microprocessor 184. Please note that the adjustment microprocessor 184 is a module separately disposed in the determination voltage adjustment device 18, but in other embodiments the adjustment microprocessor 184 may be integrated into the supplying-end microprocessor 11 or realized in the supplying-end module 10 in another form, which is not limited herein.

Figure 2:
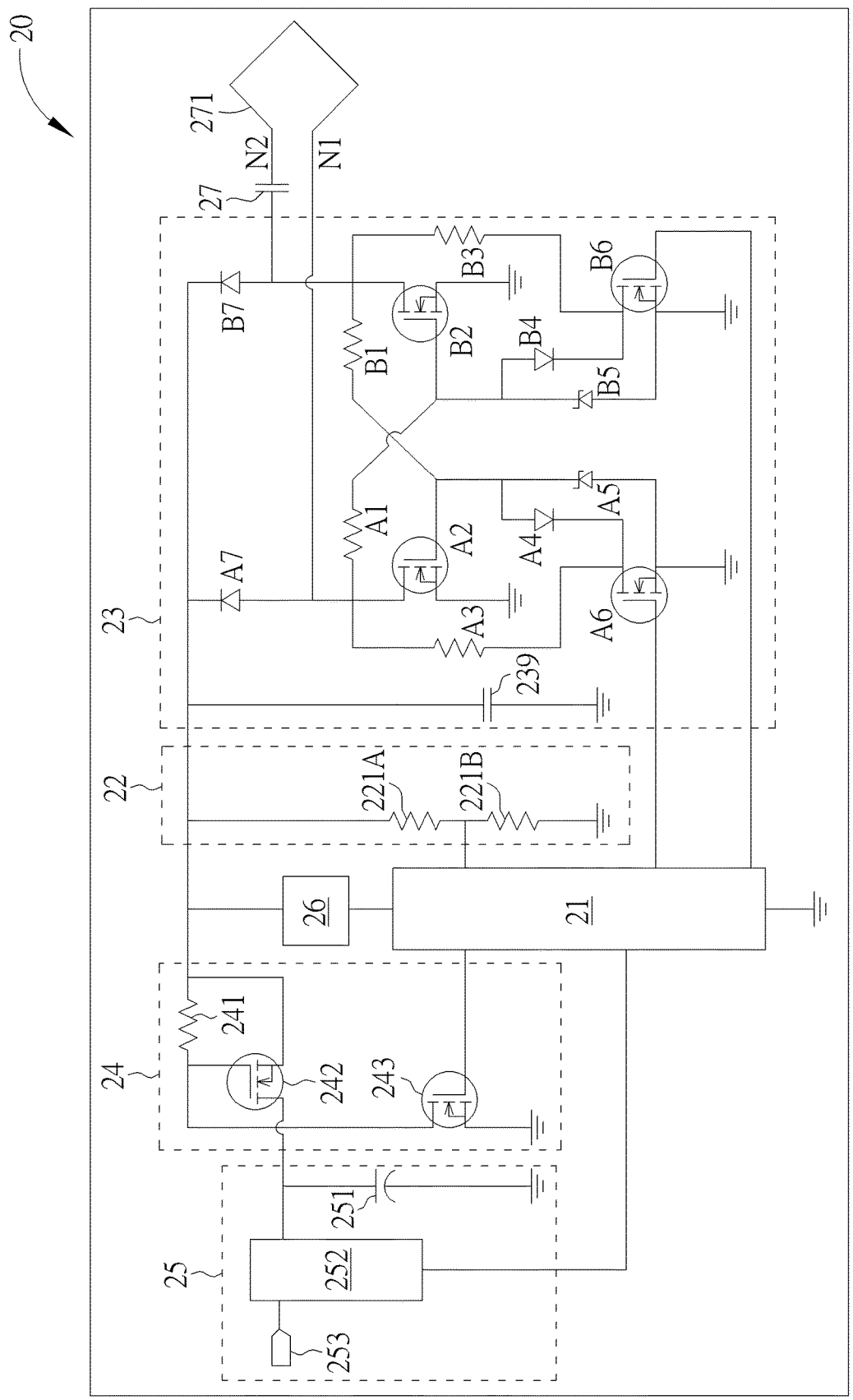
FIG. 2 is a schematic diagram of a receiving-end module of an induction type power supply system according to an embodiment of the present invention.

Please refer to FIG. 2, which is a schematic diagram of a receiving-end module 20 of an induction type power supply system according to an embodiment of the present invention. As shown in FIG. 2, the receiving-end module 20 includes a receiving-end microprocessor 21, a voltage detection circuit 22, a rectifier and signal feedback circuit 23, a protection circuit breaker 24, a voltage stabilizer circuit 25, a DC-DC buck converter 26, a resonant capacitor 27 and a receiving-end coil 271. The receiving-end microprocessor 21, electrically connected to the voltage detection circuit 22, the rectifier and signal feedback circuit 23, the protection circuit breaker 24, the voltage stabilizer circuit 25 and the DC-DC buck converter 26, is utilized for controlling each operation of the receiving-end module 20. The voltage detection circuit 22, which includes resistors 221A and 221B, is electrically connected to the receiving-end coil 271 and the receiving-end microprocessor 21. The voltage detection circuit 22 is utilized for detecting the voltage of the receiving-end coil 271 and outputting the voltage to the receiving-end microprocessor 21 for follow-up interpretation and processing. The rectifier and signal feedback circuit 23, electrically connected to the receiving-end coil 271 and the receiving-end microprocessor 21, is utilized for performing rectification on the power received by the receiving-end coil 271 and modulating the feedback signals. The protection circuit breaker 24, which includes a resistor 241 and switches 242, 243, is electrically connected between the receiving-end coil 271, the receiving-end microprocessor 21 and the voltage stabilizer circuit 25. The protection circuit breaker 24 is utilized for preventing the receiving-end module 20 and a load element of a power output terminal 253 from being burnt. The voltage stabilizer circuit 25, which includes a regulating capacitor 251 and a DC-DC buck converter 252, is electrically connected to the receiving-end coil 271 and the receiving-end microprocessor 21. Controlled by the receiving-end microprocessor 21, the voltage stabilizer circuit 25 may receive power from the receiving-end coil 271, in order to output a stable voltage to the power output terminal 253. The DC-DC buck converter 26, electrically connected to the receiving-end coil 271 and the receiving-end microprocessor 21, is utilized for receiving power from the receiving-end coil 271 to provide for the receiving-end microprocessor 21. The resonant capacitor 27 is electrically connected to the receiving-end coil 271, for assisting the receiving-end coil 271 to perform resonance to transmit AC power and signals. The receiving-end coil 271, electrically connected to the rectifier and signal feedback circuit 23 and the voltage stabilizer circuit 25, is utilized for receiving power from the supplying-end coil 171, in order to transmit the power to the output terminal via the voltage stabilizer circuit 25. The feedback signals generated by the rectifier and signal feedback circuit 23 are transmitted to the supplying-end module 10 via the receiving-end coil 271.

Please keep referring to FIG. 2, which also illustrates a detailed structure of the rectifier and signal feedback circuit 23. As shown in FIG. 2, the rectifier and signal feedback circuit 23 includes high-side diodes A7 and B7, low-side switches A2 and B2, protection resistors A1 and B1, signal modulation resistors A3 and B3, control diodes A4 and B4, zener diodes A5 and B5 and switches A6 and B6. The high-side diode A7 and the low-side switch A2, electrically connected to a terminal N1 of the receiving-end coil 271, are utilized for performing rectification. The high-side diode B7 and the low-side switch B2, electrically connected to another terminal N2 of the receiving-end coil 271, are also utilized for performing rectification. The signal modulation resistors A3 and B3, electrically connected to the terminals N1 and N2 of the receiving-end coil 271 respectively, are utilized for modulating feedback signals. In general, the signal modulation resistors A3 and B3 may have a smaller resistance value, which should be small enough to modulate feedback signals when the receiving-end module 20 has no load. The switches A6 and B6, each of which includes a drain (D) electrically connected to the signal modulation resistors A3 and B3 respectively, a source (S) electrically connected to a ground terminal, and a gate (G) electrically connected to the receiving-end microprocessor 21, is utilized for controlling the signal modulation resistors A3 and B3 to modulate feedback signals, and controlling the low-side switches A2 and B2 to perform rectification. The protection resistor A1, electrically connected between the terminal N1 of the receiving-end coil 271 and a gate of the low-side switch B2, is utilized for providing rectification switching signals and protecting the low-side switch B2 to prevent it from being burnt. The protection resistor B1, electrically connected between the terminal N2 of the receiving-end coil 271 and a gate of the low-side switch A2, is utilized for providing rectification switching signals and protecting the low-side switch A2 to prevent it from being burnt. In general, the protection resistors A1 and B1 may have a larger resistance value, which should be large enough to protect the low-side switches A2 and B2 to prevent them from being burnt. The zener diode A5, electrically connected between the gate of the low-side switch A2 and the ground terminal, is utilized for limiting the gate voltage of the low-side switch A2, in order to prevent the low-side switch A2 from being burnt. The zener diode B5, electrically connected between the gate of the low-side switch B2 and the ground terminal, is utilized for limiting the gate voltage of the low-side switch B2, in order to prevent the low-side switch B2 from being burnt. The control diode A4, electrically connected between the gate of the low-side switch A2 and the drain of the switch A6, is utilized for providing a conducting path from the gate of the low-side switch A2 to the ground terminal. The control diode B4, electrically connected between the gate of the low-side switch B2 and the drain of the switch B6, is utilized for providing a conducting path from the gate of the low-side switch B2 to the ground terminal. In one embodiment, the rectifier and signal feedback circuit 23 may include a capacitor 239, which is utilized for stabilizing the voltage.

During the operations, the receiving-end microprocessor 21 may control the switches A6 and BE to be turned on or off, respectively, in order to control the low-side switches A2 and B2 to perform half-bridge synchronous rectification or stop the rectification, and control the signal modulation resistors A3 and B3 to modulate full-wave feedback signals or half-wave feedback signals. Detailed operations are disclosed in U.S. application Ser. No. 13/541,090, and will not be narrated herein. The main difference between the rectifier and signal feedback circuit of the present invention and that disclosed in U.S. application Ser. No. 13/541,090 is that the rectifier and signal feedback circuit of the present invention utilizes different resistors for modulating the feedback signals and protecting the low-side switches. In the rectifier and signal feedback circuit 23, the signal modulation resistors A3 and B3 are utilized for modulating feedback signals, and the protection resistors A1 and B1 are utilized for protecting the low-side switches A2 and B2. For a general metal-oxide semiconductor field-effect transistor (MOSFET), a higher voltage difference may be sustained between the drain and source, but the sustainable voltage difference between the gate and other terminals may be smaller. When the voltage exerted on the gate exceeds the limitation, the switch, which is composed of a MOSFET, may be burnt. Therefore, under the structure of the rectifier and signal feedback circuit 23, the protection resistors A1 and B1 may usually be designed to possess a greater resistance value, in order to prevent the large voltage variations at the terminals N1 and N2 of the receiving-end coil 271 from being transmitted to the gate of the low-side switch A2 or B2 when the receiving-end coil 271 is receiving power. Such voltage variations may generate an instant large current to flow toward the gate of the low-side switch A2 or B2, which causes the low-side switch A2 or B2 to be burnt. The zener diodes A5 and B5 may further be disposed at the gate of the low-side switches A2 and B2, respectively, in order to eliminate extra voltages. The control diodes A4 and B4 are utilized for providing the conducting path, and preventing the AC signals from being flowing in reverse to the gate of the low-side switch A2 or B2. As a result, the feature of the low-side switches in the U.S. application Ser. No. 13/541,090 being easily burnt may be improved upon.

The signal modulation resistors A3 and B3 may usually be designed to have a smaller resistance value. When the power output terminal 253 has no load or low load, the signal modulation resistors A3 and B3 are connected to the ground terminal via the switches A6 and B6, in order to generate loads on the receiving-end coil 271. Since the signal modulation resistors A3 and B3 have a smaller resistance value, power may be exerted on the signal modulation resistors A3 and B3 during the modulating period. As a result, even if the power output terminal 253 has no load, the feedback signals may still be modulated by the signal modulation resistors A3 and B3.

Figure 3:
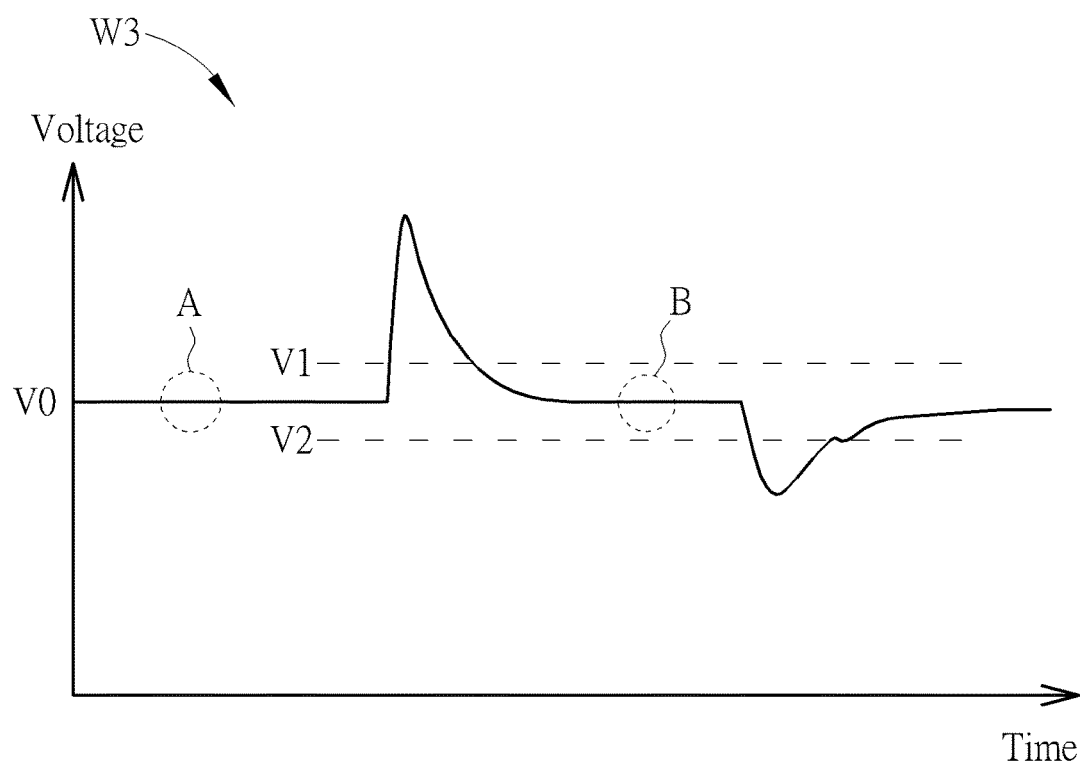
FIG. 3 is a schematic diagram of a waveform of the output signal of the signal analysis circuit in a detection phase.
Figure 4:
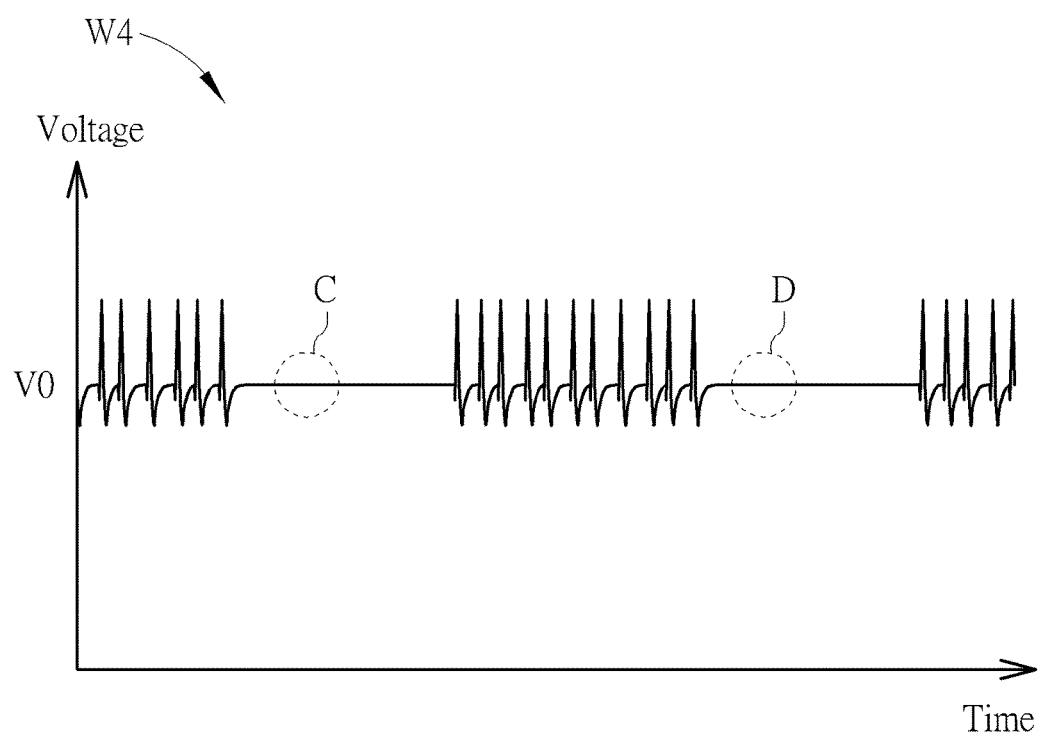
FIG. 4 is a schematic diagram of a waveform of the output signal of the signal analysis circuit in a power supplying phase

In detail, the waveform of the output signal of the signal analysis circuit 13 in the supplying-end module 10 is illustrated in FIG. 3 and FIG. 4. FIG. 3 is a schematic diagram of a waveform W3 of the output signal of the signal analysis circuit 13 in a detection phase. As shown in FIG. 3, the waveform W3 originates from the AC signal generated by resonance of the supplying-end coil 171 and the resonant capacitor 17 and is then analyzed by the signal analysis circuit 13 via rectification and low-pass filtering. When variations are generated on the voltage of the coil, these variations may be converted into pulse signals via the signal analysis circuit 13. Such pulse signals are components of the transmitted data. In the comparator 182, when the input signal is higher than the higher determination voltage V1 or lower than the lower determination voltage V2, the logic status of the output signal may vary. The adjustment microprocessor 184 evaluates the variations of the logic status in order to decode the trigger signals. Before the signal analysis circuit 13 outputs the signals to the comparator 182, the signal analysis circuit 13 outputs a normal operating voltage V0, which is a DC voltage level generated by the signal analysis circuit 13 externally connected to the power source 161 via a resistor. The DC voltage level, which may shift due to the errors of circuit elements and power source, will not be a fixed value. The waveform W3 illustrates a detection phase. With a standby status, the supplying-end module 10 that transmits power may send detection signals with regularity, in order to identify whether there is a power receiving device (at point B). Before sending the detection signals, the detector 183 first fetches the received normal voltage V0 via a program (at point A). After obtaining the voltage of the normal voltage V0, the detector 183 adds and subtracts a threshold value to generate the higher determination voltage V1 and the lower determination voltage V2. These determination voltages are then converted to the reference voltage by the output device 181, and the reference voltage is outputted to the comparator 182 for follow-up processing. The level of determination voltages can be set arbitrarily. If the determination voltage is closer to the normal voltage V0, the sensitivity will be higher. The threshold value may also be increased, in order to avoid unwanted triggers caused by noise in the signal. During the detection phase, only the higher determination voltage V1 is utilized, and no negative signals exist in this phase.

Please refer to FIG. 4, which is a schematic diagram of a waveform W4 of the output signal of the signal analysis circuit 13 during a power supplying phase. As shown in FIG. 4, during the power supplying phase, the coil may keep resonating and send signals, and the detection of the normal voltage V0 has to be performed in an interval between the triggering of data (e.g. at points C and D). In some embodiments, since data is transmitted using "timing synchronous data transmission", the system can accurately convert the normal voltage V0 in the interval. After the conversion, the obtained value will perform addition or subtraction with the threshold value via the program in the adjustment microprocessor 184, in order to generate the reference voltage. In some embodiments, there is noise in the signals, so that the adjustment microprocessor 184 may set the higher determination voltage V1 and the lower determination voltage V2 according to the average voltage value detected previously after the detector 183 converts the detected voltage into signals.

Figure 5:
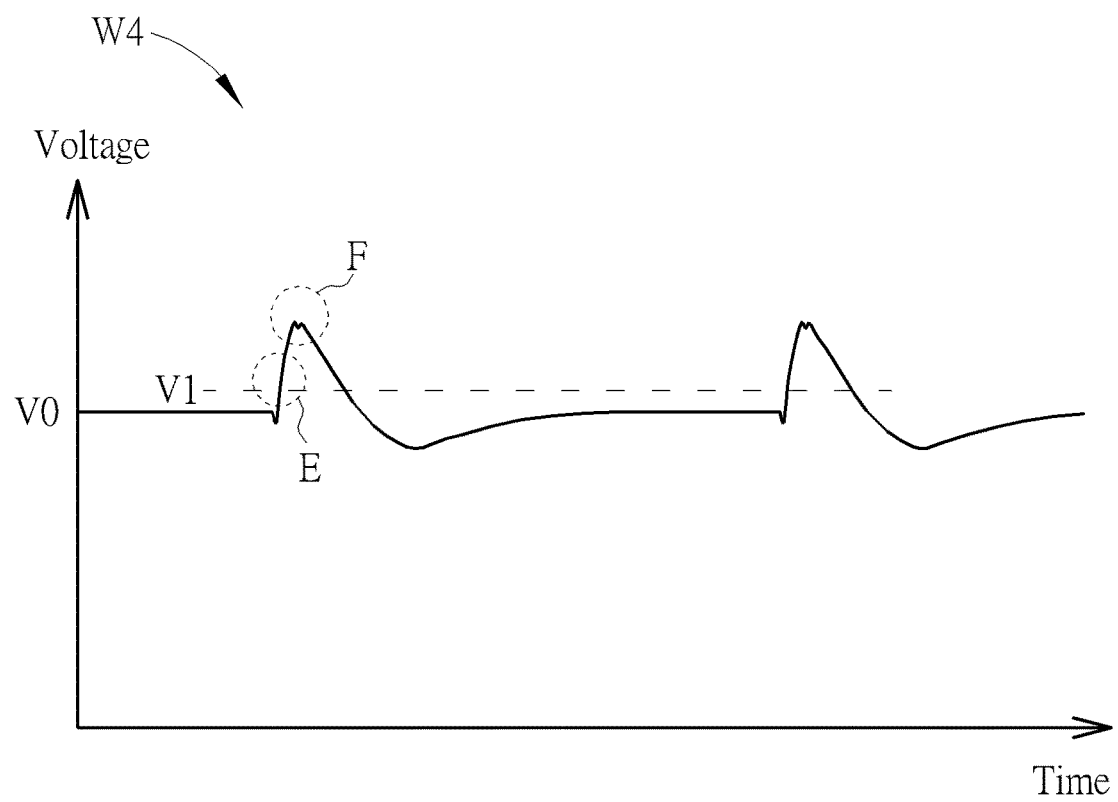
FIG. 5 is a schematic diagram of an enlarged illustration of the waveform shown in FIG. 4.

Please refer to FIG. 5, which is an enlarged illustration of the waveform W4 shown in FIG. 4. As shown in FIG. 5, voltage variations are generated in the signals of the supplying-end coil 171 since the signals receive the modulation of the receiving-end module 20. The variations are then processed by the signal analysis circuit 13 to generate the waveform W4. When the trigger signal that bulges from the normal voltage V0 is higher than the higher determination voltage V1, the comparator 182 is triggered (at point E), in order to allow the adjustment microprocessor 184 to perform decoding. In some embodiments, the adjustment microprocessor 184 may also detect the maximum value of the signal, in order to obtain the strength of the trigger signal (at point F), which will be utilized as reference information for the supplying-end microprocessor 11 to adjust quantity of output power.

Figure 6:
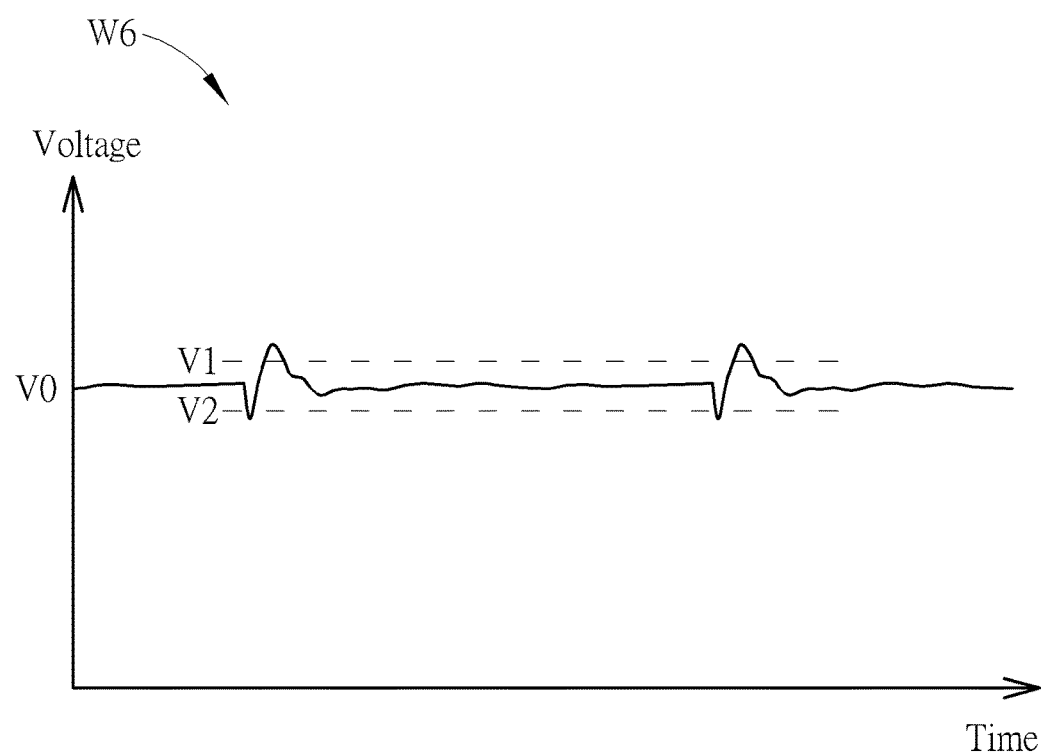
FIG. 6 is a schematic diagram of a waveform of the output signal of the signal analysis circuit when the load at the power output terminal of the receiving-end module increases according to an embodiment of the present invention.

Please refer to FIG. 6, which is a schematic diagram of a waveform W6 of the output signal of the signal analysis circuit 13 when the load at the power output terminal 253 of the receiving-end module 20 increases according to an embodiment of the present invention. In general, the modulation of feedback signals is performed by the load variations generated from the signal modulation resistors A3 and B3 in the rectifier and signal feedback circuit 23, and the feedback signals are transmitted to the supplying-end coil 171 in order to generate voltage variations. As shown in FIG. 6, after the load of the receiving-end module 20 increases, i.e. load resistance at the power output terminal 253 decreases, the signal variations generated in the signal modulation period may also decrease. The principle of feedback signal modulation is to reflect the signal via load variation. If the load resistance at the back end decreases, the modulation effect of the signal modulation resistors A3 and B3 may become worse. In FIG. 6, although the signal appears to become worse, this signal can still be triggered. It is shown that when the threshold value is smaller, the reference voltage may be closer to the normal voltage V0, so that small trigger signals may also be detected. At this moment, the strength of signals may also be interpreted after the signals are triggered; when the signal strength is determined by the adjustment microprocessor 184 to become worse, it should therefore be adjusted further using software.

Figure 7:
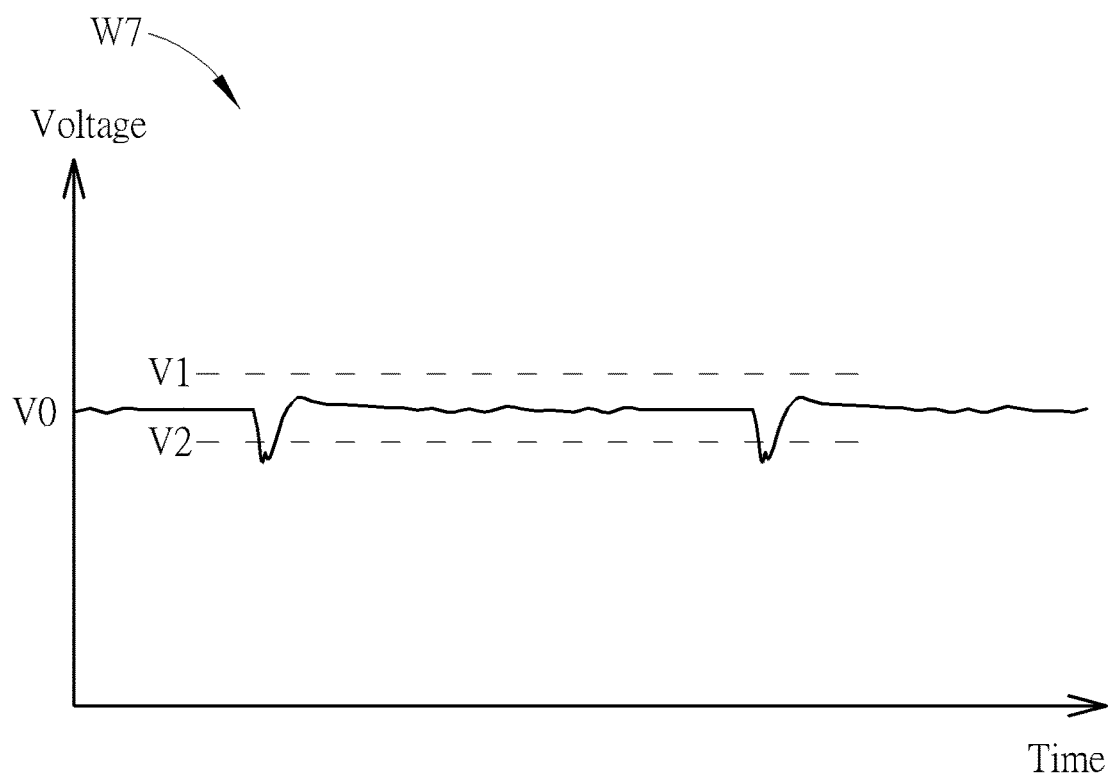
FIG. 7 is a schematic diagram of a waveform where the receiving-end module cannot generate the positive-phase feedback trigger signal when the resistance at the power output terminal of the receiving-end module is less than the signal modulation resistors A3 and B3 according to an embodiment of the present invention.

Please refer to FIG. 7, which is a schematic diagram of a waveform W7 where the receiving-end module 20 cannot generate the positive-phase feedback trigger signal when the impedance at the power output terminal 253 of the receiving-end module 20 is less than the signal modulation resistors A3 and B3 according to an embodiment of the present invention. In such a situation, the determination voltage adjustment device 18 may utilize the negative-phase trigger signal to perform interpretation. According to the features of U.S. application Ser. No. 13/541,090, when the power receiving terminal outputs high power, if the rectifier and signal feedback circuit 23 is cut off during the signal modulation period, the load of the resonating coil will vanish in a short time, which reduces the amplitude of voltage at the coil, in order to generate the negative-phase trigger signal by the signal analysis circuit 13. At this moment, the lower determination voltage V2 previously generated can be utilized as a reference voltage for detecting the trigger signal, which allows the comparator 182 to output the inverse logic signal when triggered, in order to perform signal interpretation to generate the data code.

Figure 8:
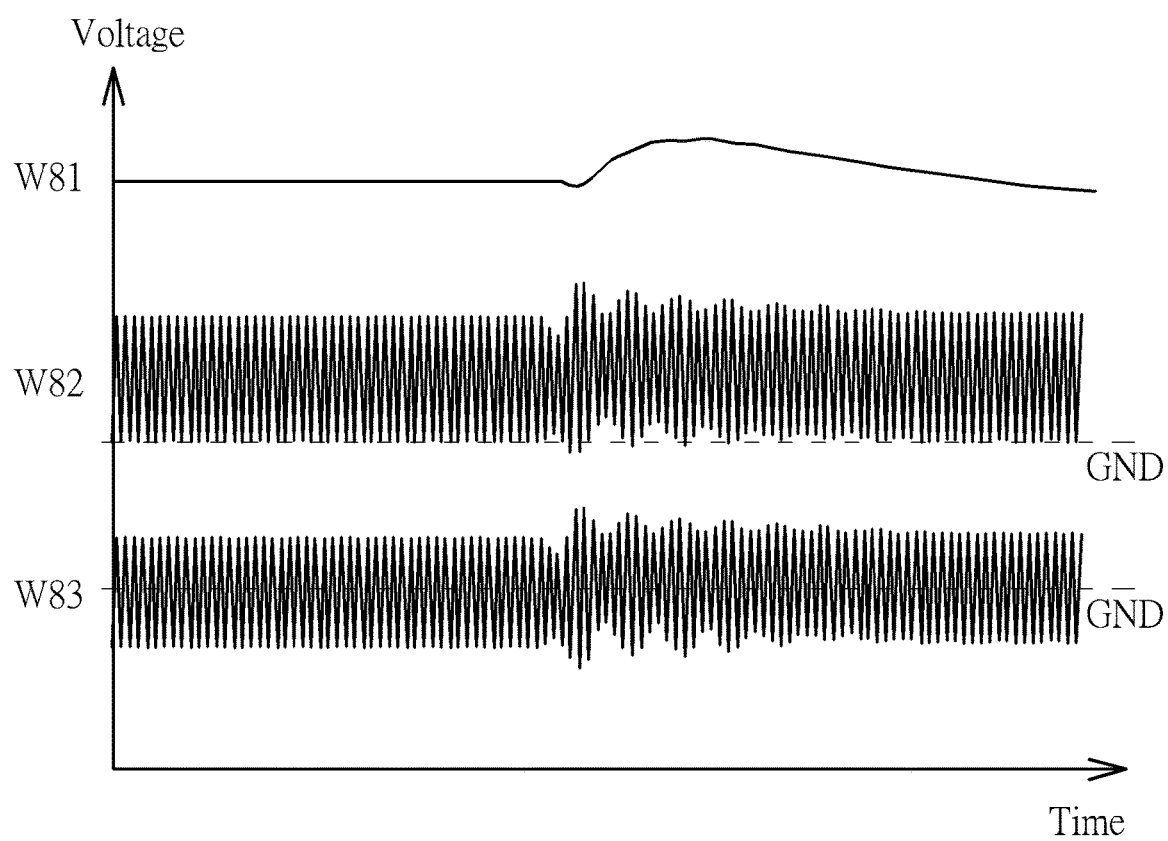
FIG. 8 is a waveform diagram of the trigger signals generated by clamping of the clamping circuit.

Please note that, in some embodiments, in order to capture tiny variations in the voltage of the supplying-end coil 171 to increase the possibility of successfully interpreting the data code, the clamping circuit 131 may be included at the front end of the signal analysis circuit 13. In U.S. application Ser. No. 13/212,564, the signals of the signal analysis circuit 13 are generated from the AC signals on the supplying-end coil 17, and such AC signals are retrieved after being rectified and low-pass filtered. In U.S. application Ser. No. 13/212,564, the signals at the supplying-end coil 17 first undergo half-wave rectification by a diode, which reduces the signal variations by half. The present invention utilizes the clamping circuit 131 to allow the signals to first pass through a capacitor C5 after entering the signal analysis circuit 13. Then, two diodes D1 and D2 are utilized together for clamping the signals; the related signals are shown in FIG. 8. The original signals are illustrated as a waveform W83, wherein after performing the clamping, the variations at the upper and lower sides of the AC signals at the coil will both increase, in order to generate a waveform W82. The waveform W82 is then filtered by a low-pass filter to obtain a larger signal strength, which is illustrated as a waveform W81.

Figure 9:
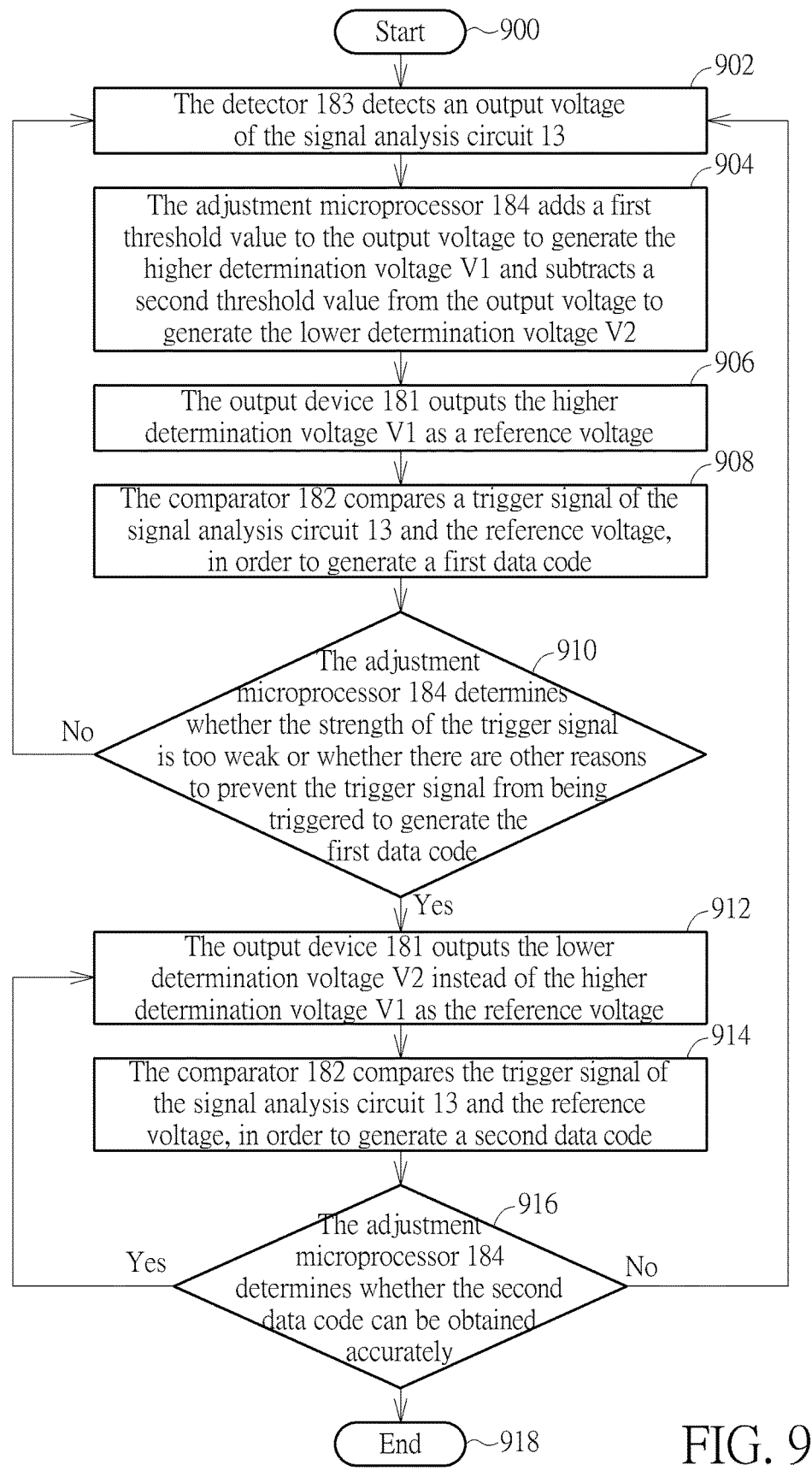
FIG. 9 is a schematic diagram of a process of automatically adjusting the determination voltage according to an embodiment of the present invention.

The above operations of the determination voltage adjustment device 18 can be summarized into a process 90 of automatically adjusting the determination voltage, as shown in FIG. 9. The process 90 of automatically adjusting the determination voltage includes the following steps:

Step 900: Start.

Step 902: The detector 183 detects an output voltage of the signal analysis circuit 13.

Step 904: The adjustment microprocessor 184 adds a first threshold value to the output voltage to generate the higher determination voltage V1 and subtracts a second threshold value from the output voltage to generate the lower determination voltage V2.

Step 906: The output device 181 outputs the higher determination voltage V1 as a reference voltage.

Step 908: The comparator 182 compares a trigger signal of the signal analysis circuit 13 and the reference voltage, in order to generate a first data code.

Step 910: The adjustment microprocessor 184 determines whether the strength of the trigger signal is too weak or whether there are other reasons to prevent the trigger signal from being triggered to generate the first data code. If yes, the flow proceeds to Step 912; otherwise, the process returns to Step 902.

Step 912: The output device 181 outputs the lower determination voltage V2 instead of the higher determination voltage V1 as the reference voltage.

Step 914: The comparator 182 compares the trigger signal of the signal analysis circuit 13 and the reference voltage, in order to generate a second data code.

Step 916: The adjustment microprocessor 184 determines whether the second data code can be obtained accurately. If yes, go to Step 912; otherwise, go to Step 902.

Step 918: End.

Please note that the present invention provides a method of automatically adjusting the determination voltage and the determination voltage adjustment device thereof capable of amplifying the strength of a feedback signal in the induction type power supply system, and realizing the reference voltage for the comparator by using a circuit structure with higher accuracy, in order to enhance the sensitivity of signal interpretation. Such a method of automatically adjusting the determination voltage and determination voltage adjustment device can automatically control the comparator to use a positive-phase or negative-phase trigger signal to perform the interpretation, and adjust a magnitude of the reference voltage. Those skilled in the art can make modifications and alterations accordingly. For example, the above realization of switches by MOSFETs is only one embodiment, and N-type or P-type MOSFETs may also be utilized according to system requirements. In other embodiments, the structures of the supplying-end module 10 and the receiving-end module 20 may also be realized by using other type of switches. The power driver units 12A and 12B, the power supplying unit 16, the voltage detection circuit 22, the protection circuit breaker 24, the voltage stabilizer circuit 25 and the DC-DC buck converters 164, 26 and 252 mentioned above are common circuits having specific functions. The implementations of such modules are not limited to the structures shown in FIG. 1 and FIG. 2, and may also be realized by other circuit structures, as long as the specific purposes or functions can be achieved.

To sum up, the induction type power supply system of the present invention possesses a determination voltage adjustment device providing a method of automatically adjusting the determination voltage. Such a method and device can automatically control the comparator to use a positive-phase or negative-phase trigger signal to perform the interpretation, and adjust magnitude of the reference voltage. When noise interference needs to be prevented, the difference between the reference voltage and the normal voltage can be enlarged. When the sensitivity for signal interpretation needs enhancement, the difference between the reference voltage and the normal voltage can be reduced. The rectifier and signal feedback circuit has the functions of modulating strong feedback signals and providing well-protected switches. The signal analysis circuit can amplify the strength of feedback signals, in order to increase the possibility of successfully interpreting the data code. The determination voltage adjustment device is realized by a circuit structure with higher accuracy, which enhances the accuracy and sensitivity for signal interpretation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of automatically adjusting a determination voltage used in an induction type power supply system, comprising:
   detecting an output voltage of a signal analysis circuit;
   adding a first threshold value to the output voltage to generate a first determination voltage and subtracting a second threshold value from the output voltage to generate a second determination voltage;
   outputting the first determination voltage as a reference voltage; and
   comparing a trigger signal of the signal analysis circuit and the reference voltage, in order to generate a first data code;
   wherein when the step of comparing the trigger signal of the signal analysis circuit and the reference voltage in order to generate the first data code fails, the method further comprises:
   outputting the second determination voltage instead of the first determination voltage as the reference voltage, and comparing the trigger signal of the signal analysis circuit and the reference voltage, in order to generate a second data code.

2. The method of claim 1, further comprising detecting a maximum value of the trigger signal of the signal analysis circuit, in order to obtain strength of the trigger signal.

3. The method of claim 1, wherein the step of detecting the output voltage of the signal analysis circuit is performed during a period that a power receiving device of the induction type power supply system is not transmitting signals.

4. The method of claim 1, wherein the signal analysis circuit clamps an input signal of the signal analysis circuit to a higher voltage level, in order to increase strength of the trigger signal, which in turn increases a possibility of successfully generating the first data code.

5. A determination voltage adjustment device used in an induction type power supply system, comprising:
   a detector, for detecting an output voltage of a signal analysis circuit;
   an adjustment microprocessor, electrically connected to the detector, for adding a first threshold value to the output voltage to generate a first determination voltage and subtracting a second threshold value from the output voltage to generate a second determination voltage;
   an output device, electrically connected to the adjustment microprocessor, for outputting the first determination voltage as a reference voltage; and
   a comparator, having two input terminals electrically connected to the detector and the output device respectively and an output terminal electrically connected to the adjustment microprocessor, for comparing a trigger signal of the signal analysis circuit and the reference voltage, in order to generate a first data code;
   wherein when the comparator fails to generate the first data code by comparing the trigger signal of the signal analysis circuit and the reference voltage, the output device outputs the second determination voltage instead of the first determination voltage as the reference voltage, and the comparator compares the trigger signal of the signal analysis circuit and the reference voltage, in order to generate a second data code.

6. The determination voltage adjustment device of claim 5, wherein the detector further detects a maximum value of the trigger signal of the signal analysis circuit, in order to obtain strength of the trigger signal.

7. The determination voltage adjustment device of claim 5, wherein the detector detects the output voltage of the signal analysis circuit during a period that a power receiving device of the induction type power supply system is not transmitting signals.

8. The determination voltage adjustment device of claim 5, wherein the signal analysis circuit comprises a clamping circuit, for clamping an input signal of the signal analysis circuit to a higher voltage level, in order to increase strength of the trigger signal, which in turn increases a possibility of successfully generating the first data code.

9. The determination voltage adjustment device of claim 5, wherein the detector comprises an analog-to-digital converter for converting the trigger signal into a signal in digital form, in order to be outputted to the adjustment microprocessor for follow-up interpretation and processing.

10. The determination voltage adjustment device of claim 5, wherein the output device comprises a digital-to-analog converter for converting the first determination voltage or the second determination voltage outputted by the adjustment microprocessor into the reference voltage in analog form, in order to be outputted to the comparator for follow-up interpretation and processing.

* * * * *